United States Patent [19]

Asai et al.

[11] Patent Number: 5,991,291
[45] Date of Patent: *Nov. 23, 1999

[54] SERVER OF A COMPUTER NETWORK TELEPHONE SYSTEM

[75] Inventors: Masahiro Asai, Chiba; Akimasa Oyama, Tokyo; Hidekazu Watanabe, Chiba, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/766,483

[22] Filed: Dec. 13, 1996

[30] Foreign Application Priority Data

Dec. 19, 1995 [JP] Japan .................................. 7-348833

[51] Int. Cl.$^6$ .................................................. H04L 12/56
[52] U.S. Cl. ............................................ 370/352; 379/201
[58] Field of Search .................................. 370/260, 261, 370/262, 263, 264, 265, 266, 267, 268, 401, 400, 402, 403, 404, 259, 405, 406, 352, 353, 354, 355, 356; 455/31.3; 379/201, 210, 211, 212, 214, 90.01, 91.02, 93.01, 93.02, 93.03, 93.04, 93.07, 93.14, 93.21, 93.23, 93.24, 100.06, 100.08

[56] References Cited

U.S. PATENT DOCUMENTS

| | | | |
|---|---|---|---|
| 4,796,293 | 1/1989 | Blinken et al. | 379/202 |
| 4,953,159 | 8/1990 | Hayden et al. | 370/265 |
| 5,210,794 | 5/1993 | Brunsgard | 370/264 |
| 5,408,528 | 4/1995 | Carlson et al. | 379/201 |
| 5,526,353 | 6/1996 | Henley et al. | 370/401 |
| 5,588,038 | 12/1996 | Snyder | 455/31.3 |
| 5,590,127 | 12/1996 | Bales et al. | 370/260 |
| 5,604,737 | 2/1997 | Iwami et al. | 370/352 |
| 5,608,786 | 3/1997 | Gordon | 379/100 |
| 5,712,907 | 1/1998 | Wegner et al. | 379/112 |
| 5,724,355 | 3/1998 | Bruno et al. | 370/401 |

Primary Examiner—Huy D. Vu
Attorney, Agent, or Firm—Jay H. Maioli

[57] ABSTRACT

A server is used in a computer network telephone system having a computer network that can connect a plurality of terminal devices via at least one server to transmit data containing audio data between the terminal devices. The server provides predetermined services for the terminals when it receives predetermined information from the terminals.

10 Claims, 18 Drawing Sheets

| TERMINAL NAME | INTERNET NAME | CONNECTION FORMAT | PHONE NUMBER FOR PPP | USER NAME | OTHER INFORMATION |
|---|---|---|---|---|---|
| H_WATANABE | hnabe | PPP | 03-3458 -XXXX | HIDEKAZU WATANABE | • • • • |
| A_OYAMA | oyama | DIRECT IP | | AKIMASA OYAMA | • • • • |
| | | | | | |

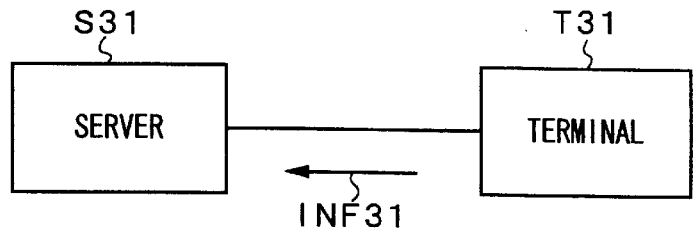
Fig. 8A
Fig. 8B
```
T31 → ABSENCE
FAX ××-××× YES
Email ××-××× NO
```
Fig. 8D
```
LOG SERVICE
FROM    TIME    MESSAGE
×××     00:00   NO
×××     00:00   YES
```
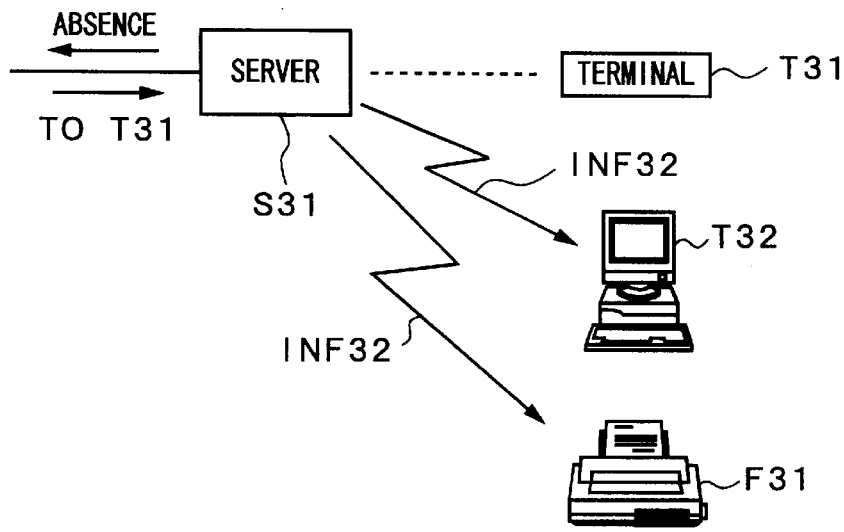
Fig. 8C
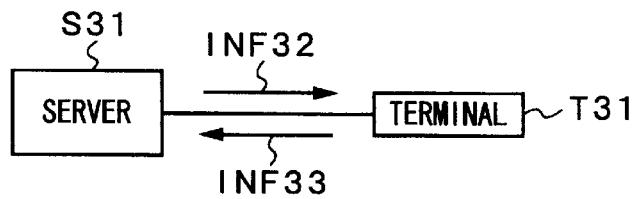
Fig. 8E

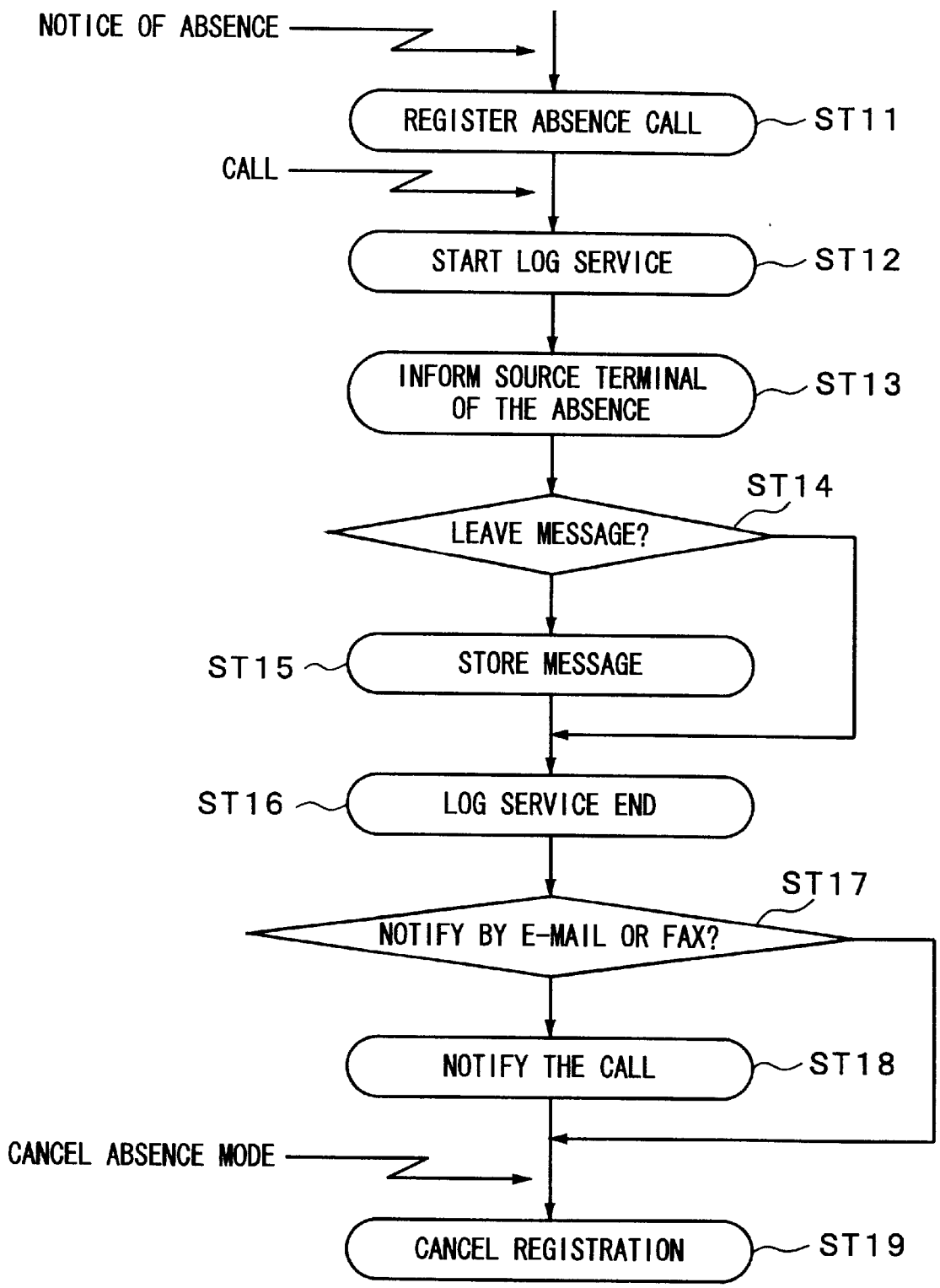

Fig. 10A
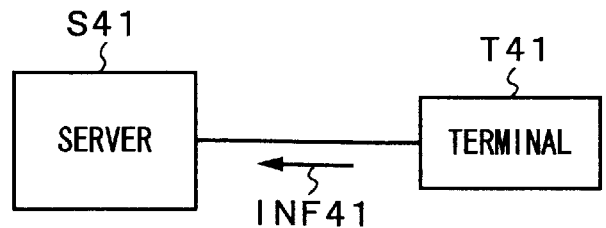
Fig. 10B
|  | CURRENT |
|---|---|
| INTERNET PHONE (HOME) | O |
| INTERNET PHONE (BUISINESS) |  |
| CELLER PHONE |  |
| PAGER |  |
| FAX |  |
| E-MAIL |  |
Fig. 10C
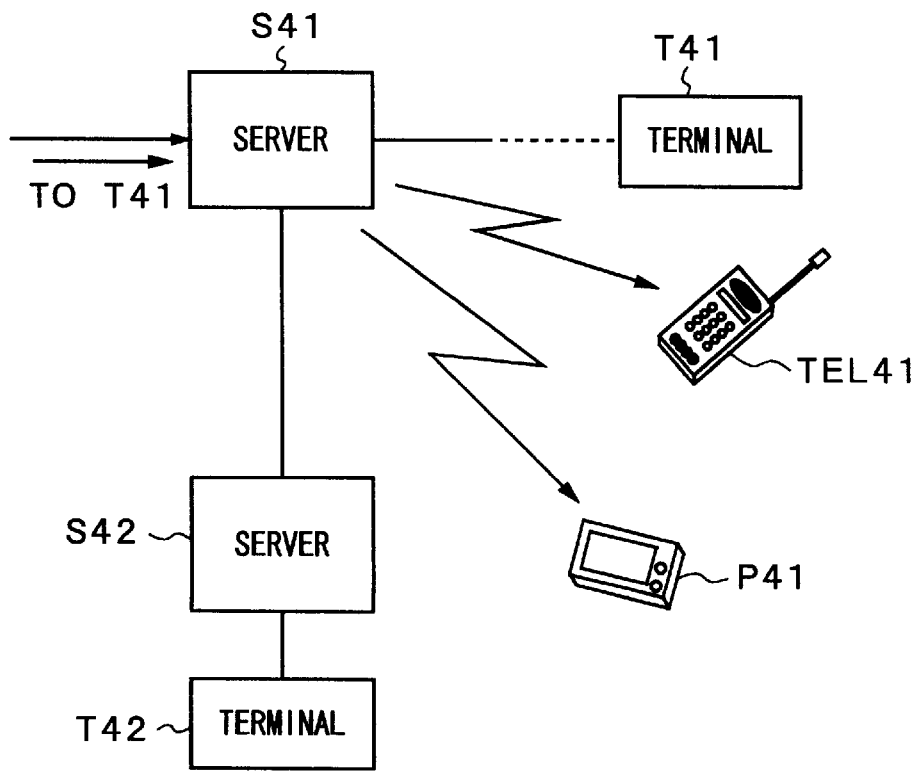

Fig. 12A
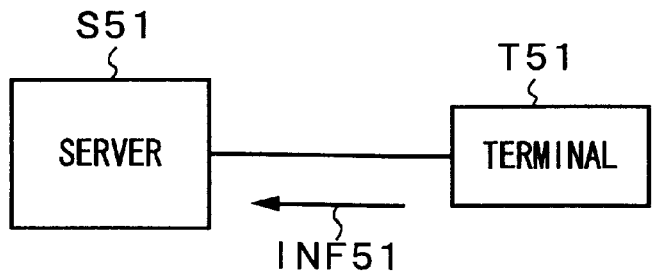
Fig. 12B
| NAME | PRIORITY/REJECTION |
|---|---|
| ×××× | REJECT |
| △△△△ | NORMAL |
| ○○○○ | PRIOR |
|  |  |
|  |  |
Fig. 12C
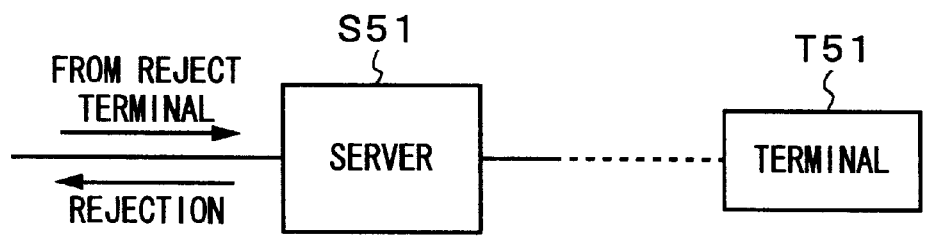
Fig. 12D
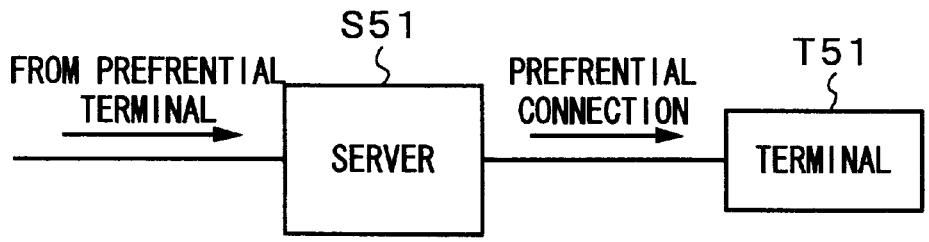

SERVER OF A COMPUTER NETWORK TELEPHONE SYSTEM

BACKGROUND OF THE INVENTION

1. Field of the Invention

This invention relates to a server of a computer network telephone system suitable for use as an internet telephone for exchanging audio data through the internet that is a worldwide computer network system.

2. Related Art

The internet is a worldwide computer network system connecting computer networks in corporations or universities beyond countries. Increasingly provided are various services using the internet, such as e-mail service, file transfer service, and information search service.

FIG. 1 schematically shows a general aspect of the internet. In FIG. 1, each of computer networks NET101, NET102, NET103, . . . has a plurality of terminals T which are connected together by LAN (Local Area Network) in form of Ethernet or a token ring.

These computer networks NET101, NET102, NET103, . . . are connected together through routers R101, R102, R103, . . . that route data from a computer network to another, depending on the destination of the data.

Computer networks NET101, NET102, NET103, . . . are connected through the routers R101, R102, R103, . . . and form a computer network system. The computer network system is called internet. The internet enables exchanges of data among computer networks NET101, NET102, NET103, . . . throughout the world.

The internet uses IP (Internet Protocol) as the protocol of its network layer. IP assigns an IP address to each terminal to identify a destination terminal of data. Each IP address is made up of four numerals each of which can be expressed by decimal 8 bits, such as 43.3.25.246.

As the internet is extended, the number of IP addresses possibly becomes insufficient. In some networks in which a large number of terminals are registered but only a small number of terminals are connected simultaneously, for example, it is possible to use a server on the network to allot currently available IP addresses to only actually connected terminals in order to minimize the number of IP addresses used. In this manner, the network need not prepare IP addresses in the number corresponding to its terminals, but can effectively use a limited number of IP addresses.

The internet uses TCP (Transmission Control Protocol) and UDP (User Datagram Protocol) as protocols of its transport layer. TCP permits communication while establishing a connection-type transmission connection, and deals with packet sequence control, re-transmission, flow control and congestion control. UDP is a connectionless-type protocol that is used in lieu of TCP in networks requiring real-time transmission. In digital audio transmission, for example, retransmission is not requested even when a part of packets drops, but audio data is sent successively. In such audio transmission, UDP is used.

Thus, the internet basically uses TCP/IP protocol. That is, IP addresses are assigned to terminals of a computer network to identify individual terminals, and packets are transferred by TCP or UDP.

However, personal computers are not always connected by LAN, and there are some without IP addresses. Therefore, some individuals participating on the internet use internet service providers. Through internet service providers, personal computers can be connected to computer networks and can participate on the internet by, for example, PPP (Point to Point Protocol) or SLIP (Serial Line IP) through telephone lines.

FIG. 2 shows a construction of an internet service provider. The computer network NET151 of the internet service provider includes a server S151 and a router R151. The server S151 is connected to a public telephone line network TEL151 via modems M151, M152, M153, . . .

Terminals T151, T152, T153, . . . are those of individuals personally participating on the internet. Terminals T151, T152, T153, . . . are connected to the public telephone line network TEL151 through modems (not shown). Individual terminals T151, T152, T153, . . . may be personal computers having serial ports.

For participation in the internet through an internet service provider, users make a contract with an internet service provider in most cases. When a contract is executed between a user and an internet service provider, an account code and a password are sent to the user.

When an individual participates in the internet from one of the terminals T151, T152, T153, . . . , the user dials into the internet service provider to call up the server S151 of the computer network NET151 of the provider. The server S151 responsively requests entry of the account code and the password for authentication whether the user is a contractor. When the server S151 authenticates that the entered account code and password are those of a contractor, it searches for an available IP address. If there is any IP address available, it temporarily assigns it to the terminal T151, T152, T153, or any other. Thus, the terminal obtaining the temporary IP address can connect to the internet.

In the above example, terminals are connected by PPP using telephone lines. However, ISDN (Integrated Service Digital Network) may be used alternatively. ISDN includes three channels, namely, two B channels of 64 kbps and one D channel of 16 kbps. When ISDN is used, it can be used as a line of 64 kbps by sending IP packets on the B channels.

Internet telephones for effecting telephone communication using the internet are now being developed. Since the internet is basically free of charge, what is to be paid by the user for internet telephone communication through the internet is the charge based on the contract with the internet service provider and the charge for the call between the user and the internet service provider or the charge for the use of ISDN. Thus, users can enjoy long-distance telephone calls and international telephone calls very economically.

In addition to mere telephone calls, various other services are looked for from internet telephones. For example, it is desired to accept or reject access only from registered terminals, display information that identifies a source terminal, send an absence message during absence, and transfer a call to another telephone or pager. Telephone conversation by three persons is also desired.

OBJECTS AND SUMMARY OF THE INVENTION

It is therefore an object of the invention to provide a server of a computer network telephone system, which can provide various services.

According to the invention, there is provided a server of a computer network telephone system having a computer network that can connect a plurality of terminal devices via at least one server to transmit data containing audio data between the terminal devices, wherein the server provides predetermined services for the terminals when the server receives predetermined information from the terminals.

When the server receives a call request to a destination terminal from which a notice of absence is previously given as the predetermined information, the server stores log information indicating the call request.

When the server receives a call request to a destination terminal from which a notice of absence is previously given as the predetermined information, the server sends a notice of the call request to a designated e-mail address by e-mail.

When the server receives a call request to a destination terminal from which a notice of absence has been in advance as the predetermined information, the server sends a notice of the call request to a designated facsimile number by facsimile.

When the server receives a call request to a destination terminal from which a transfer request is previously given as said predetermined information, the server calls up a designated telephone number.

When the server receives a call request to a destination terminal from which a transfer request is previously given as the predetermined information, the server calls up a designated pager.

The server informs the pager of an optimum server for connection with the pager.

When the server receives a call request to a destination terminal from which a call choice request has been given in advance as the predetermined information, the server reviews whether the call request is from a source terminal specified by the call choice request, and connects or does not connect the source terminal to the destination terminal.

According to another aspect of the invention, there is provided a server of a computer network telephone having a computer network that can connect a plurality of terminal devices via at least one server to transmit data containing audio data between the terminal devices, wherein the server connects a source terminal and a plurality of destination terminals when the server receives a call request from the source terminal to the destination terminals.

The server divides four or more terminals connected together into two or more groups in response to a request from one or more of the terminals.

The invention can realize various services, such as connecting or disconnecting only previously registered terminals, displaying information on a source terminal, and sending a notice of absence during absence of a destination terminal. Moreover, it can include a service to give a user information on a call to him through his e-mail, facsimile or pager. This service of advising a call to a user enables the user to carry his pager and terminal with him and to use the internet telephone even when he is out. Also included is the service to transfer a call to a user to his other terminal or portable telephone. The invention also permits three or more persons to participate on a common telephone call without increasing the traffic density.

BRIEF DESCRIPTION OF THE DRAWINGS

FIGS. 8A to 8E are schematic diagrams for use in explanation of a service of an internet telephone system to which the invention is applicable;

FIG. 9 is a schematic diagram for use in explanation of a service of an internet telephone system to which the invention is applicable;

FIGS. 10A to 10C are schematic diagrams for use in explanation of another service of an internet telephone system to which the invention is applicable;

FIGS. 12A to 12D are schematic diagrams for use in explanation of still another service of an internet telephone system to which the invention is applicable;

DESCRIPTION OF THE PREFERRED EMBODIMENTS

The present invention is applied to an internet telephone for transmitting audio data through the internet, and is especially suitable for use of internet telephones connected by PPP through public telephone networks.

Figure 1:
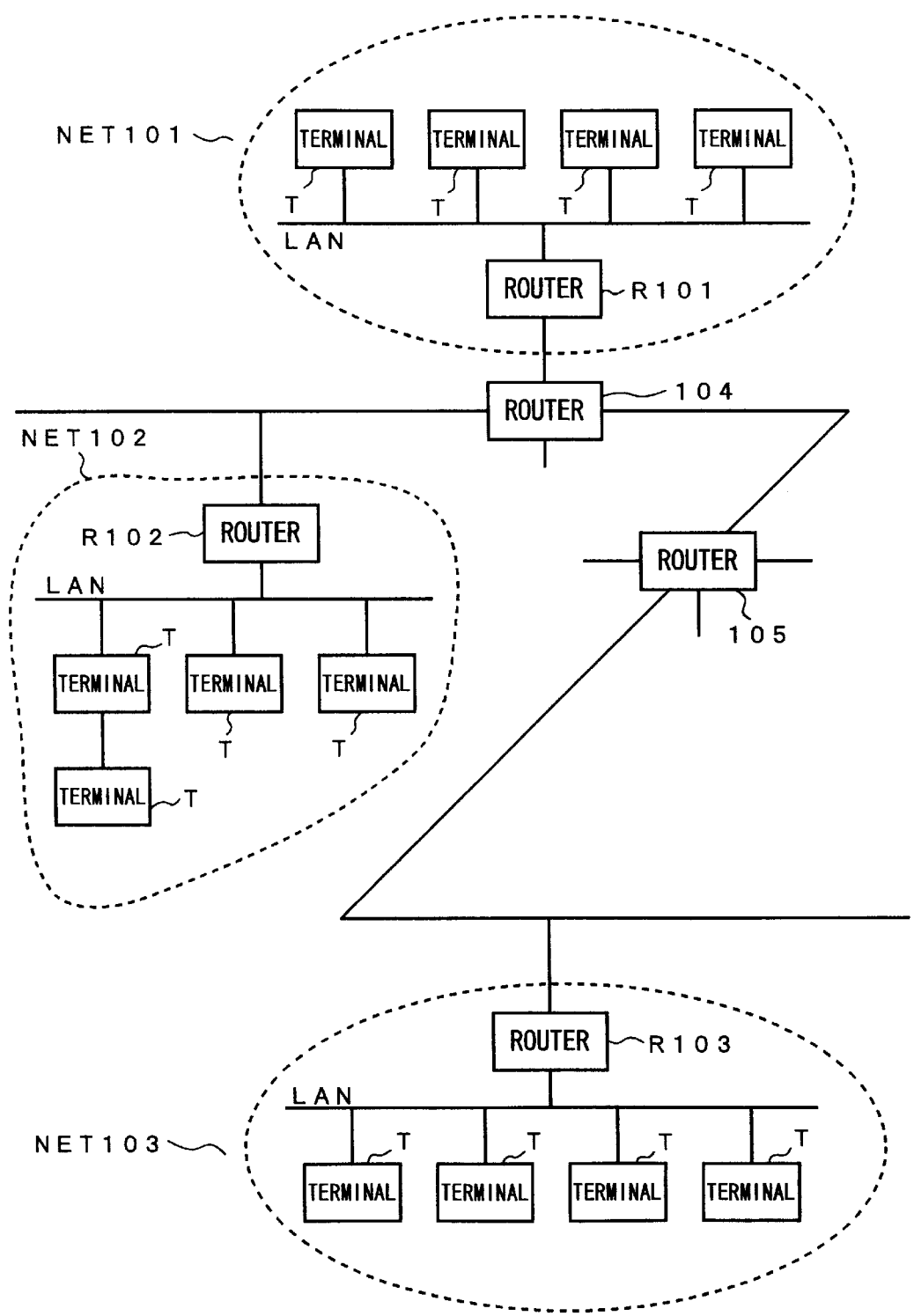
FIG. 1 is a block diagram for use in explanation of the internet.
Figure 2:
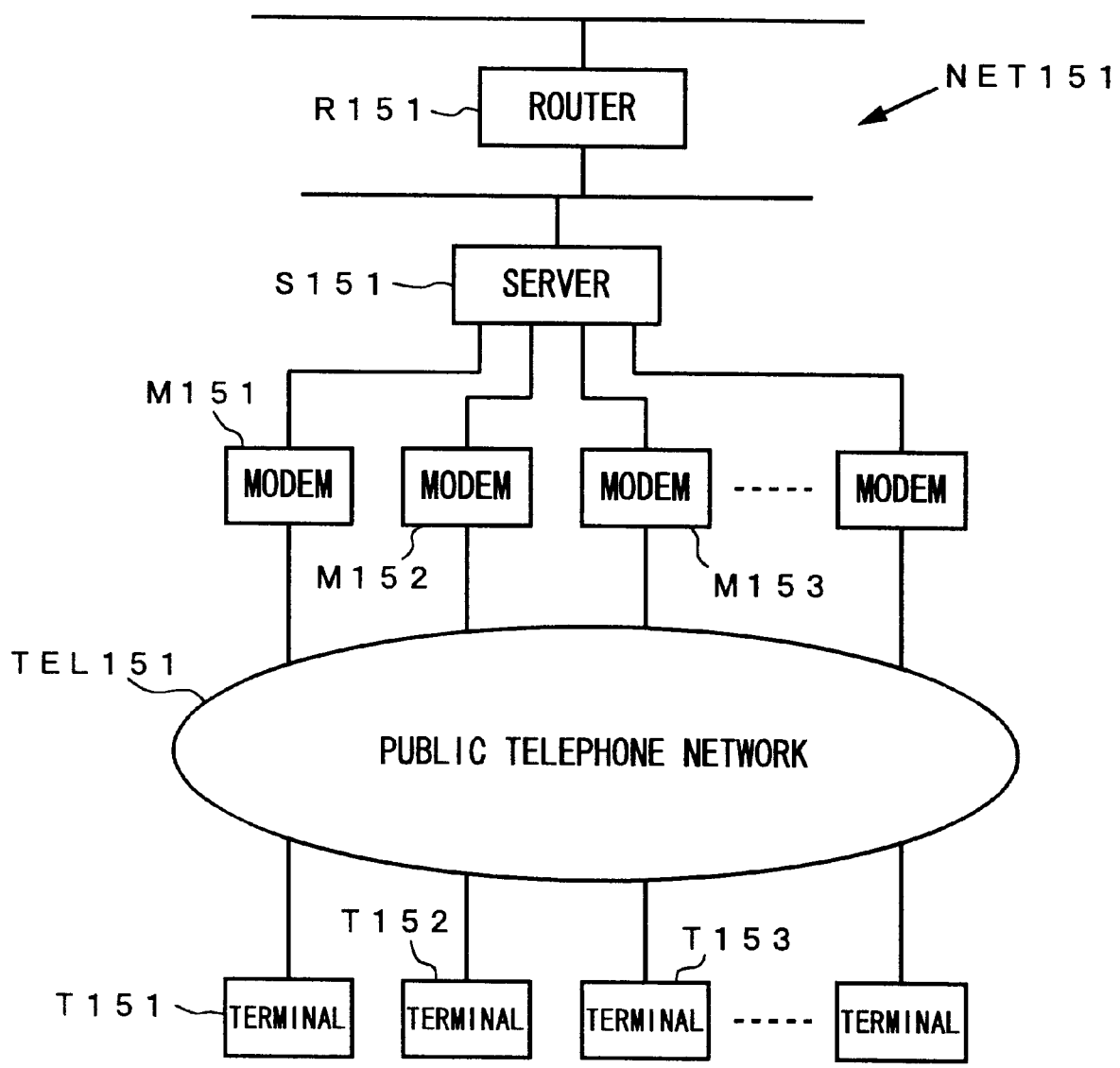
FIG. 2 is a block diagram for use in explanation of PPP connection.
Figures 3, 4:
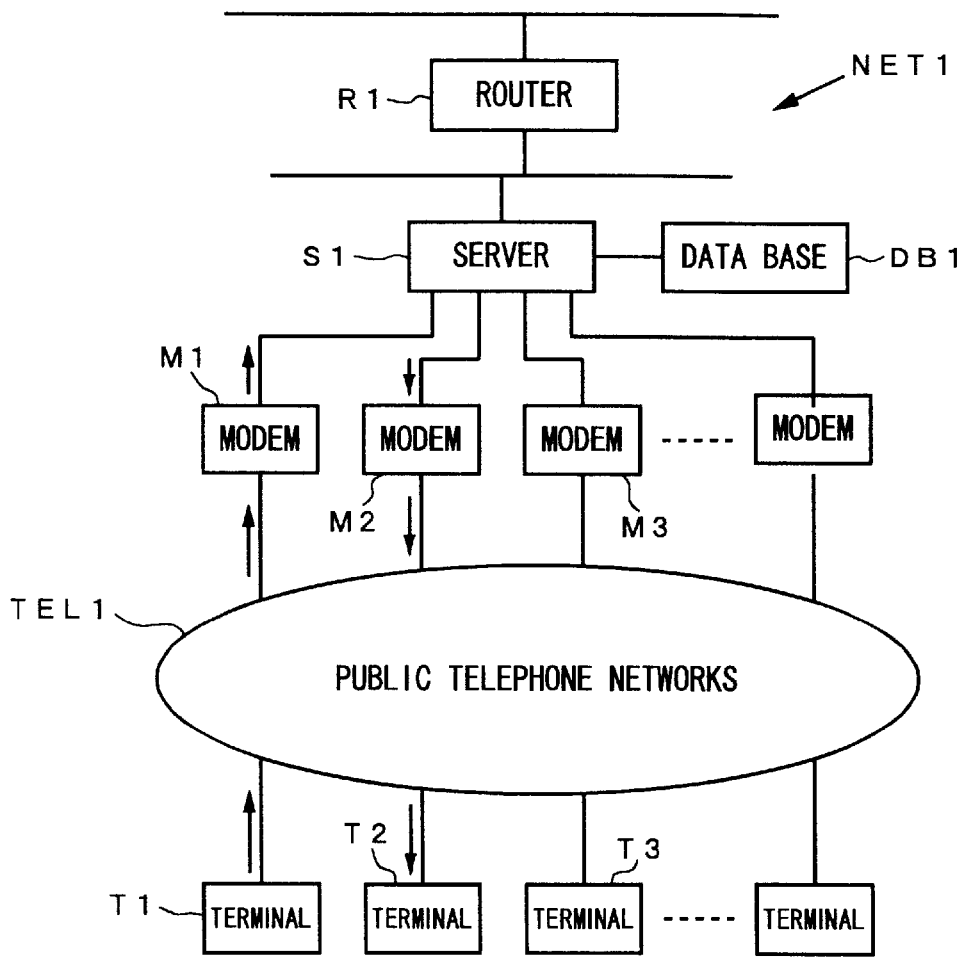
FIG. 3 is a block diagram for use in explanation of an internet telephone system to which the invention is applicable.
FIG. 4 is a schematic diagram for use in explanation of an internet telephone system to which the invention is applicable.

FIG. 3 shows an internet telephone system to which the invention is applicable. In FIG. 3, a computer network NET1 is, for example, a computer network prepared by an internet service provider. The computer network NET1 contains a server S1 and a router R1.

The server S1 is connected to a public telephone network TEL1 through modems M1, M2, M3, . . . Currently, data can be transmitted at the rate of 28.8 kbps through the public telephone network TEL1 by using a high-speed modem.

The computer network NET1 is connected to other computer networks forming the internet through the router R1. The router R1 routes data on the computer network to another computer network containing a destination terminal.

Terminals T1, T2, T3 . . . are those of individuals personally participating on the internet. Individual terminals T1, T2, T3, . . . may be personal computers installed with an internet telephone program or exclusive internet telephone sets. Exclusive internet telephone sets are terminals exclusive to internet telephones facilitating telephone communication using the internet as explained later.

The server S1 has a data base DB1. As shown in FIG. 4, the data base DB1 stores "terminal names", "internet names", "connection types", "public phone numbers for PPP", "users' names", and others. The data base DB1 may be established using information obtained from contents of contracts concluded between the internet service provider and users. When the connection type is PPP, the data base DB1 contains telephone numbers for PPP of users contracting with the internet service provider by PPP connection.

Although the terminals T1, T2, T3, . . . are connected to the server S1 by PPP through the public telephone network in the above example, they may be connected through a digital network such as ISDN.

Next explained is a telephone call control in a telephone system. Assume here that a telephone call from the terminal T1 to the terminal T2 is desired in FIG. 3. The internet requires an IP address to specify a destination terminal. In this case, it is possible that the destination terminal T2 to be connected by PPP is not currently connected to the computer network NET1 and cannot be accessed by using its IP address. To cope with the matter, the data base DB1 is used.

Figure 5:
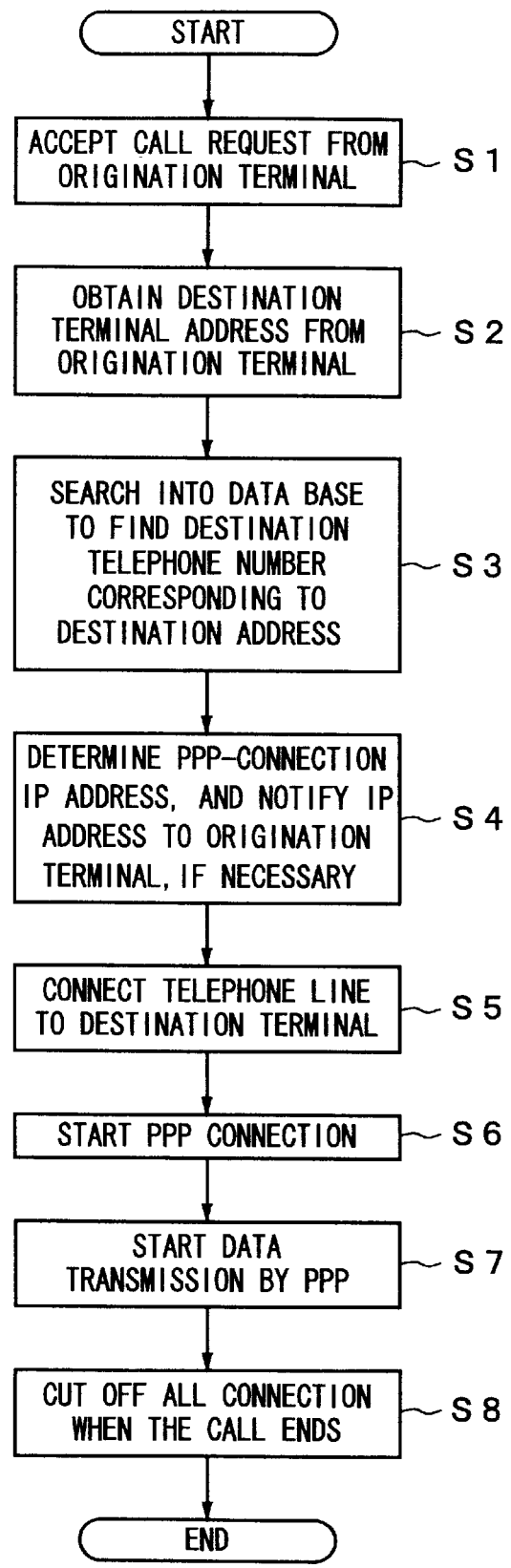
FIG. 5 is a flow chart for use in explanation of an internet telephone system to which the invention is applicable.

FIG. 5 is a flow chart showing the accessing process using the data base DB1. First, the source terminal T1 dials the computer network NET1 of the internet service provider to call up the server S1 of the computer network NET1. Responsively, the server S1 requests the terminal T1 to enter its account code and password to authenticate whether the source terminal T1 is one of contractors of the internet service provider. The user of the source terminal T1 answers the request by entering its account code and password. When the server S1 authenticates that the entered account code and password are those of a contractor, it assigns a temporary IP address to the terminal T1. Thus, PPP connection with the terminal T1 is started (step ST1).

After that, the terminal T1 designates a desired destination address (for example, terminal T2) (step ST2).

Responsively, the server S1 searches into the data base DBi to find out information on the terminal T2 corresponding to the requested destination address. The telephone number of the terminal T2 for PPP connection can be known from information in the data base DB1 (step ST3).

The server S1 subsequently determines an IP address for specifying the destination terminal T2 within the server to prepare for PPP connection, and gives a notice on the destination terminal's IP address to the source terminal T1 (step ST4).

Then, the server S1 dials the telephone number of the terminal T2 found out from the data base DB1 to call up the terminal T2. When connection of the telephone line to the destination terminal T2 is confirmed, the server S1, after authentication, assigns the IP address to the destination terminal (step ST5).

PPP connection is thus started (step ST6). As a result, audio data is exchanged for communication between the terminals T1 and T2 (step ST7). The audio data is transmitted in a compressed form. For exchanging audio data, UDP is used as the protocol of the transport layer.

When the communication ends, all connections including PPP connection and telephone line connections between the terminal T1 and the server S1, and between the terminal T2 and the server S1 are disconnected (step STB).

Although the above example is configured to determine the IP address of the terminal T2 prior to completing access to the terminal T2, the IP address of the terminal T2 may be determined after the access to the terminal T2 is completed. It is also possible to inform the source terminal T1 of the assigned IP address, if necessary. When the source terminal is informed of the IP address at the time when the server determines the IP address of the destination terminal, the source terminal can prepare for communication with the destination terminal such that the terminals can smoothly proceed to communicate.

In this manner, the data base DB1 is provided which stores information on telephone number for PPP connection, and a destination terminal is accessed to through the telephone number obtained from the data base DB1 when the destination terminal is a PPP-connected terminal (T2, for example). Then, the destination terminal T2 is connected to the server S1 by PPP. Therefore, even when the destination terminal is a PPP-connected terminal, the destination terminal can be called up for communication.

Figure 6:
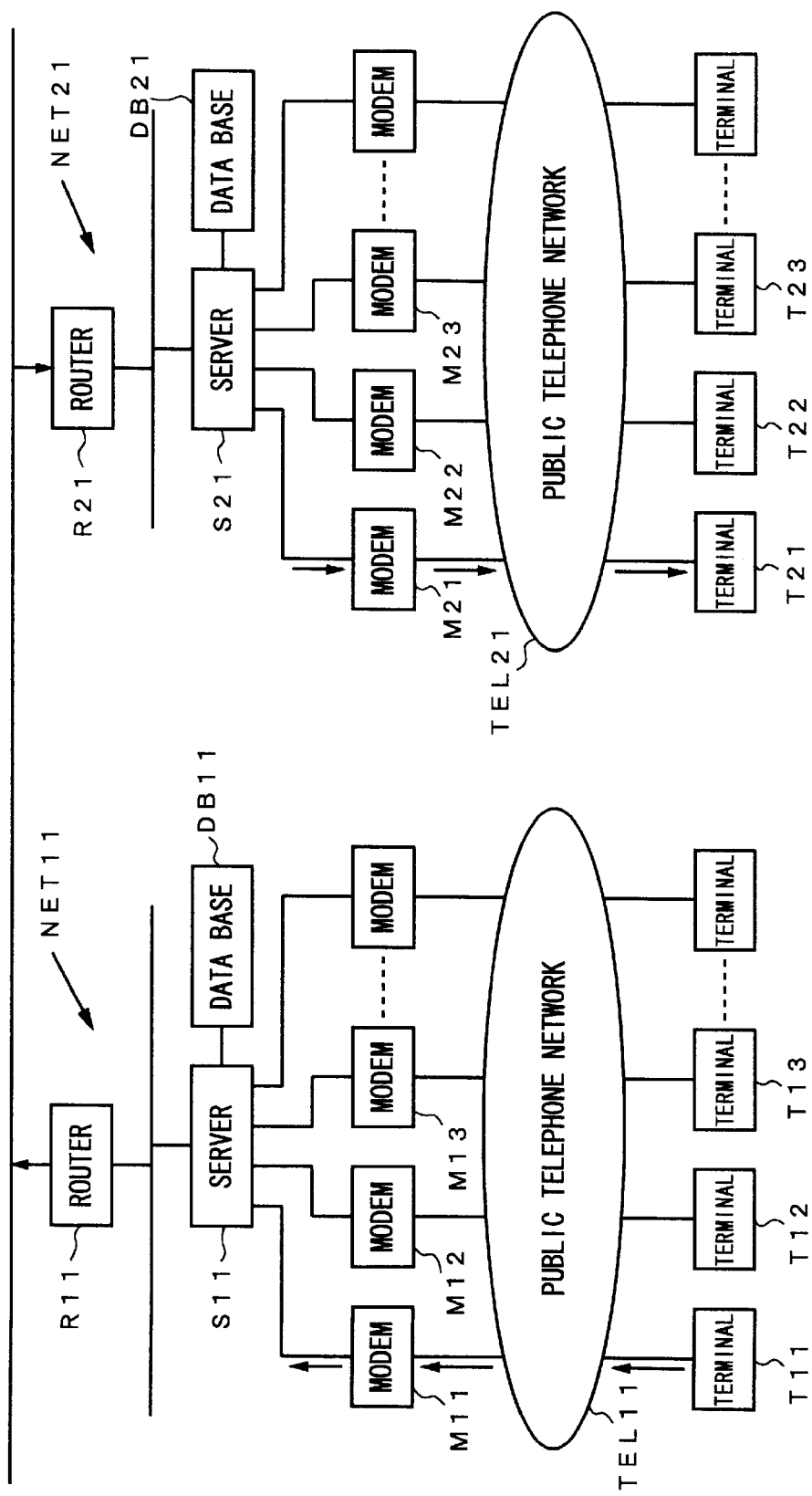
FIG. 6 is a block diagram for use in explanation of another internet telephone system to which the invention is applicable.

In the above example, a terminal is connected for communication with another terminal in a common computer network. However, a terminal in a computer network can be connected for communication also with a terminal in another computer network. FIG. 6 shows an example where terminals in different computer networks are connected for communication.

In FIG. 6, a computer network NET11 is, for example, a computer network prepared by an internet service provider. The computer network NET11 contains a server S11 and a router R11. The server S11 is connected to a public telephone network TEL11 through modems M11, M12, M13, . . . The server S11 has a data base DB11. The data base DB11 stores information containing telephone numbers of terminals connected by PPP to the computer network NET11. The computer network NET11 is connected to other computer networks forming the internet through the router R11. The router R11 routes data on the computer network to an appropriate computer network containing a destination terminal. Terminals T11, T12, T13 . . . are those of individuals personally participating on the internet.

A computer network NET21 is, for example, a computer network prepared by another internet service provider. The computer network NET21 contains a server S21 and a router R21. The server S21 is connected to a public telephone network TEL21 through modems M21, M22, M23, . . . The server S21 has a data base DB21. The data base DB21 stores information containing telephone numbers of terminals connected by PPP to the computer network NET21. The computer network NET21 is connected to other computer networks forming the internet through the router R21. The router R21 routes data on the computer network to an appropriate computer network containing a destination terminal. Terminals T21, T22, T23 . . . are those of individuals personally participating on the internet.

Figure 7:
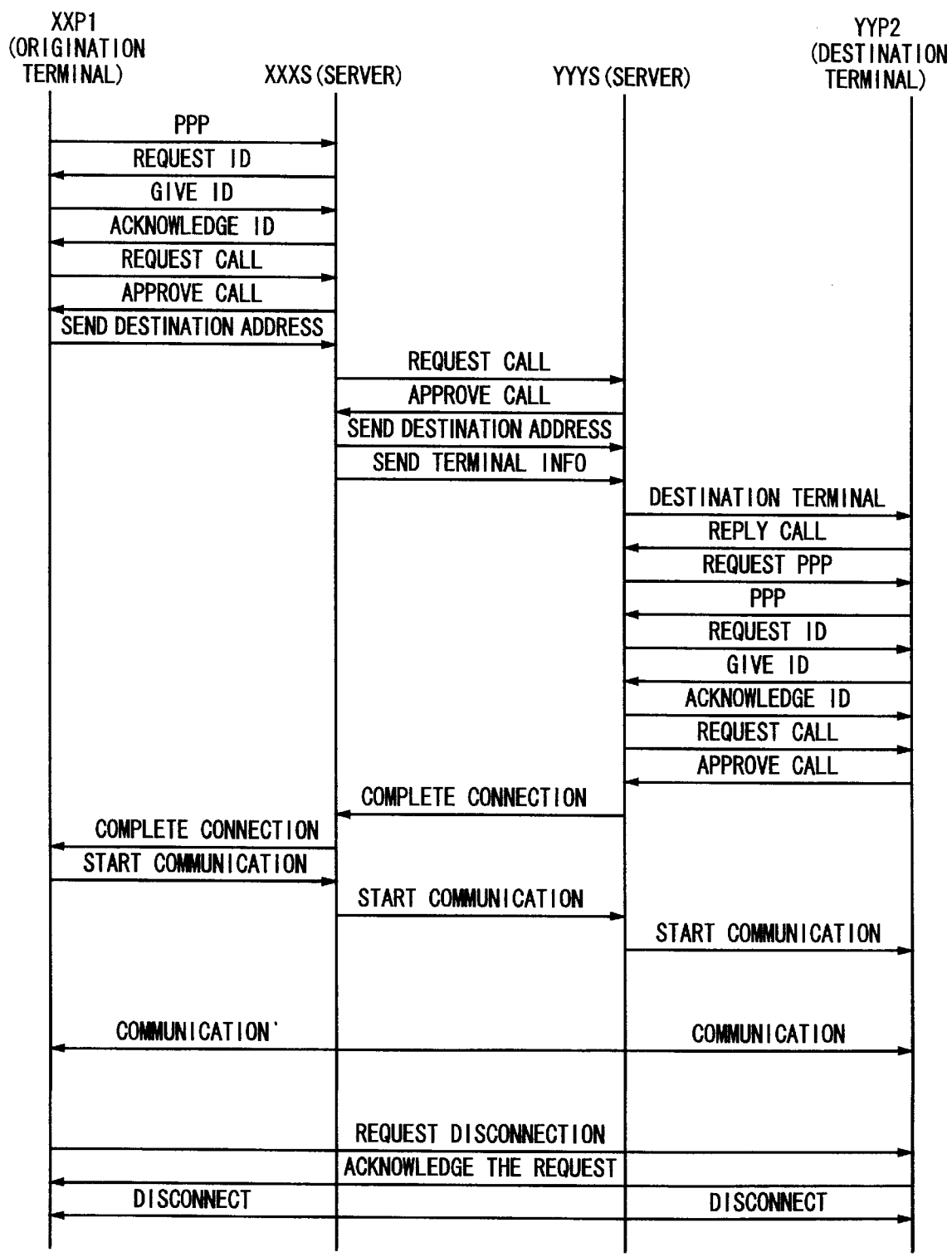
FIG. 7 is a flow chart for use in explanation of another internet telephone system to which the invention is applicable.

Assume here that the terminal T11 desires a telephone call to the terminal T12. In this case, a process is progressed as shown in FIG. 7.

First, the source terminal T11 dials the computer network NET11 of the internet service provider to call up the server S11 of the computer network NET11. Responsively, the server S11 requests the terminal T11 to enter its account code and the password for authentication whether the source terminal T11 is one of the contractors of the internet service provider.

The user of the source terminal T11 answers the authentication request by entering its account code and the password. When the server S11 confirms that the entered account code and password are those of a contractor, it assigns a temporary IP address to the terminal T11. Thus, PPP connection of the terminal T11 is started.

After that, the terminal T11 sends a call request to the server S11, and the server S11 sends back a call approval. In receipt of the call approval, the terminal T11 gives a desired destination address (terminal T21, for example).

The server S11 connected to the source terminal in receipt of the destination address sends a call request for communication with the terminal T21, for example, to the server S21 of the computer network (NET21, for example) containing the destination terminal. In receipt of the call request for communication with the terminal 21, the server S21 sends back a call approval to the server S11. In receipt of the call approval, the server S11 of the network NET11 containing the source terminal sends the destination address and information on the source terminal.

The server S21 of the computer network NET21 containing the destination terminal searches into the data base DB21 to find out information on the terminal T21. The telephone number of the terminal T21 for PPP connection can be known from information of the data base DB21. The server S21 of the computer network NET21 dials the telephone number of the terminal T21 obtained from the data base DB21 to call up the terminal T21.

The destination terminal T21 accessed by the server S21 sends back an acknowledgement. The server S21 in receipt of the acknowledgement requests PPP connection, and the terminal T21 in receipt of the request for PPP connection gives confirmation of PPP connection.

The server S21 then requests entry of the account code and the password for authentication. In response to the authentication, the user of the destination terminal enters the account code and the password. When the entered account code and password are confirmed to be those of a proper contractor, an IP address is assigned to the terminal T21. Thus, PPP connection of the terminal T21 is started.

When the PPP connection is started, a call request is sent from the server S21 to the terminal T21, and a call approval is sent back from the terminal T21 to the server S21. Then, the server S21 of the computer network NET21 sends a call connection completion notice to the server S11 of the computer network NET11, and the server S11 sends a call connection completion notice to the terminal T11. As a result, audio data is exchanged for communication between the terminals T11 and T21.

When a disconnection request is issued from the source terminal T11, for example, after the communication ends, the disconnection request is sent to the destination terminal T21. In receipt of the disconnection request, the terminal T21 sends back a disconnection agreement to the terminal T11, and all connection is disconnected.

The internet telephone system is available for various services in addition to mere telephone calls by voice. These services are explained below.

First explained are a log service during absence and a call recording service during absence. In some cases, one cannot respond to a call from a source terminal through either internet or other telephone system during his absence, or he does not want to personally respond to a call when he is busy. The log service during the user's absence and the call recording service during the user's absence are such that, if the terminal user informs a server of his absence or busyness, then retrieved later by accessing the server. Alternatively, a user may request in advance that any call should be noticed by facsimile or e-mail.

As shown in FIG. 8A, a terminal T31 sends an absence noticing information INF31 to a server S31. The absence information INF31 includes a notice of absence, desired way of sending a notice during absence among facsimile, e-mail and others, and facsimile number, e-mail address or others, as shown in FIG. 8B.

As shown in FIG. 8C, when the server S31 receives a call to the terminal T31, it informs the source terminal of the absence of the terminal T31, and stores information on the source terminal, INF32 (FIG. 8D). If the terminal T31 indicates in advance a particular address for sending the notice during absence, the information on the source terminal, INF32, is sent to the designated place.

When the terminal T31 is next connected to the server S31, the absence information INF32 is sent to the terminal T31 as shown in FIG. 8E. After that, in response to absence release information INF33 from the terminal T31, the log service during absence is canceled.

FIG. 9 is a flow chart of these transactions. As shown in FIG. 9, the absence of the terminal is registered (step ST11). When the server receives a call, it records information on the source terminal (step ST12), and informs a notice of absence to the source terminal (step ST13). The server then inquires whether the source terminal has any message to the destination terminal (step ST14). If any, the server stores the message (step ST15), and then finalizes recording of information (step ST16). If no message is given, the server immediately finalizes recording of information (step ST16). If there is a prior request to send a notice by e-mail or by facsimile (step ST17), the call is noticed by the chosen way (step ST18). The registration is deleted upon a request from the terminal to finalize the registration of absence (step ST19).

Next explained is an automatic transfer service. A user may have a plurality of terminals at different locations, like his home and his office. Another may have a portable telephone or pager when he is out of the location of his terminal. The automatic transfer service is a system where a user registers in a server his additional terminal accessible even during his absence, and the server accesses the registered additional terminal to transfer a call received during absence.

For example, as shown in FIG. 10A, transfer address information INF41 is sent from a terminal T41 to a server S41. The transfer address information INF41 contains home and office internet telephone numbers, other usable terminals such as portable telephone and pager, and indication of selected one of the terminals to which a call during absence should be transferred (called a current).

As shown in FIG. 10C, when the server S11 receives a call to the terminal T41, it calls up one of the home terminal T41, office terminal T42, portable telephone TEL41, pager P41 specified as the current. The office terminal T42 is in the territory of a server S42. If the internet telephone office terminal T42 is specified as the current as shown in FIG. 10B, the internet telephone office e terminal T42 in the territory of the server S42 is called up when a call to the internet telephone home terminal T41 arises.

Figure 11:
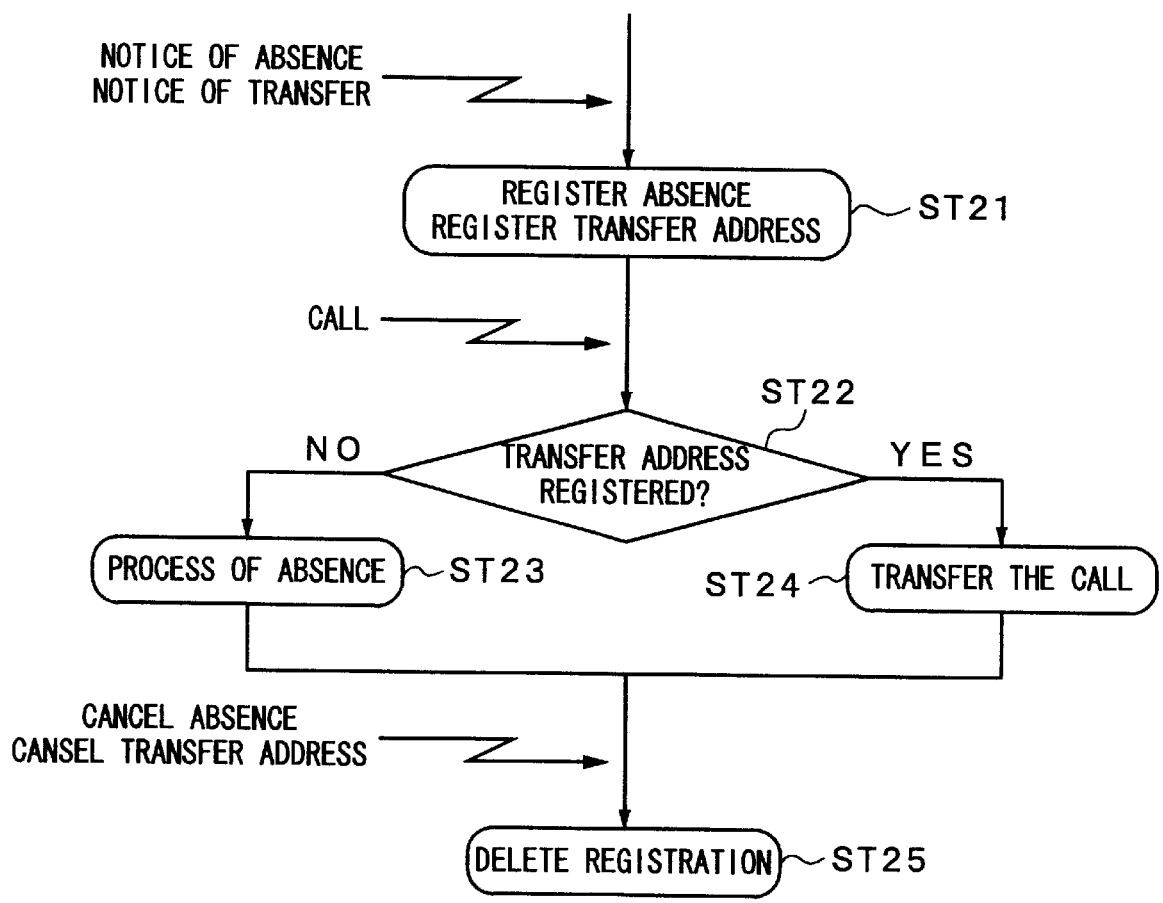
FIG. 11 is a schematic diagram for use in explanation of another service of an internet telephone system to which the invention is applicable.

FIG. 11 is a flow chart of these transactions. As shown in FIG. 11, the absence of a terminal and an address for transfer of calls are registered (step ST21. When a call to the terminal arises, it is reviewed whether any transfer address is registered (step ST22). If not, transactions for care during absence are made (step ST23). If registration of a transfer address is confirmed in step ST22, the call is transferred to the registered transfer address (step ST24). The registration is deleted upon a request from the terminal to cancel the absence care and the transfer address (step ST25).

In this case, it is also possible to instruct the source terminal directly access to another server to which a usable destination terminal is connected, in lieu of the server with the registration of absence. Moreover, by registering a pager number or portable telephone number, it is possible to use the log service through the pager or to receive an absence-caring recording service through the portable telephone. It is also possible to register the order of priority among some transfer addresses so as to be accessed sequentially. That is, by registering the home, office and portable telephone in this order, they are accessed in the order of priority until a transferred call is responded.

Next explained is a call choice function that enables a user to reject mischievous calls or other embarrassing calls and to preferentially accept calls from particular source terminals.

Either in an internet telephone system or in a normal telephone system, users are accessed from many and unspecified persons any time regardless of their convenience. To cope with this matter, a user may register in its server specified source terminals in an order of priority. The order of priority may be indicated by call rejection or call preference. Call rejection is a transaction in which a server rejects calls to a user from particular source terminals that are registered by the user as being terminals from which the user does not want to be accessed. This is used for avoiding mischievous telephone calls. Call preference is a transaction in which the server permits access to the user only from particular source terminals registered by the user as being terminals from which the user wants to be accessed. This is used to receive calls only from the registered terminals even when the user is busy and does not want to be disturbed by other calls.

For example, as shown in FIG. 12A, priority information INF51 is sent from a terminal T51 to a server S51. As shown in FIG. 12B, the priority information INF51 contains terminals whose calls should be rejected or preferentially received. When the server S51 receives a call to the terminal T51, it refers to the priority information INF51 to confirm whether the source terminal is one of the terminals to be rejected or preferentially received. If it is to be rejected as shown in FIG. 12C, the server S51 rejects the call. If it is to be preferentially received, the server S51 receives it.

Figure 13:
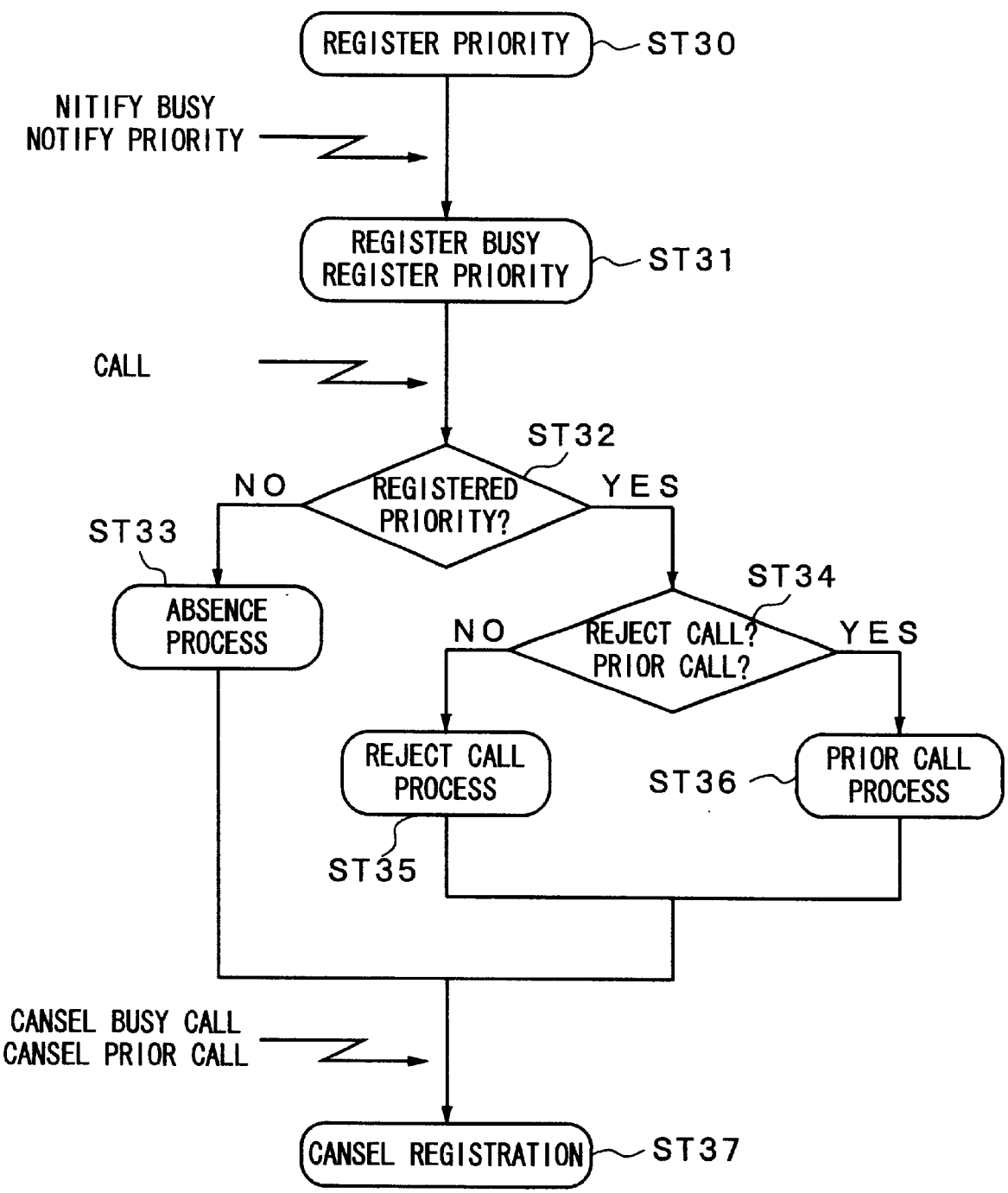
FIG. 13 is a schematic diagram for use in explanation of still another service of an internet telephone system to which the invention is applicable.

FIG. 13 is a flow chart of these transactions. Previously made is registration of priority processing, specifying terminals to be preferentially received or rejected (step ST30). When a notice of busyness is given to the server S51, registration of busyness is made, and the priority processing is made active. When any call arrives, it is judged whether there is a priority registration for the destination terminal (step ST32). If not, then the absence care processing, such as giving a message to the source terminal and storing a message from the source terminal, is made (step ST33). If there is a priority registration, it is reviewed whether the source terminal is listed in the registered terminals (step ST34). If the source terminal is one of terminals to be rejected, a process for rejecting the call is made (step ST35). If the source terminal is one of terminals to be preferentially received, a process for receiving the call is made (step ST36). The registration is deleted in receipt of a request for canceling absence and a request for canceling priority processing (ST37).

Figure 14:
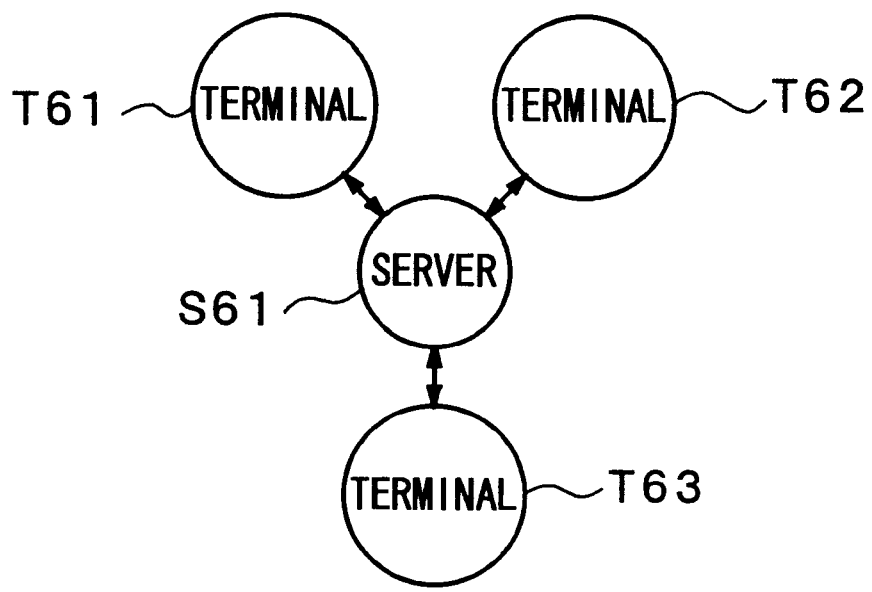
FIG. 14 is a schematic diagram for use in explanation of still another service of an internet telephone system to which the invention is applicable.

Next explained is a telephone call service permitting telephone conversation among three or more persons. In FIG. 14, three users of terminals T61, T62 and T63 desire to participate in a common telephone call. In this case, the user of the terminal T61 requests the server S61 to connect it to both terminals T62 and T63. In response to the request, the server S61 establishes connection to the terminals T62 and T63. In this case, connection is made not only from the terminals T61 to T62 and T63 but also between T62 and T63. As a result, conversation among three terminals T61, T62, T63 is made possible.

If users request, the server can cut off, for a moment, at least one terminal from a call by three or more terminals connected together or divide four or more terminals connected together for a common call into some groups.

Figure 15:
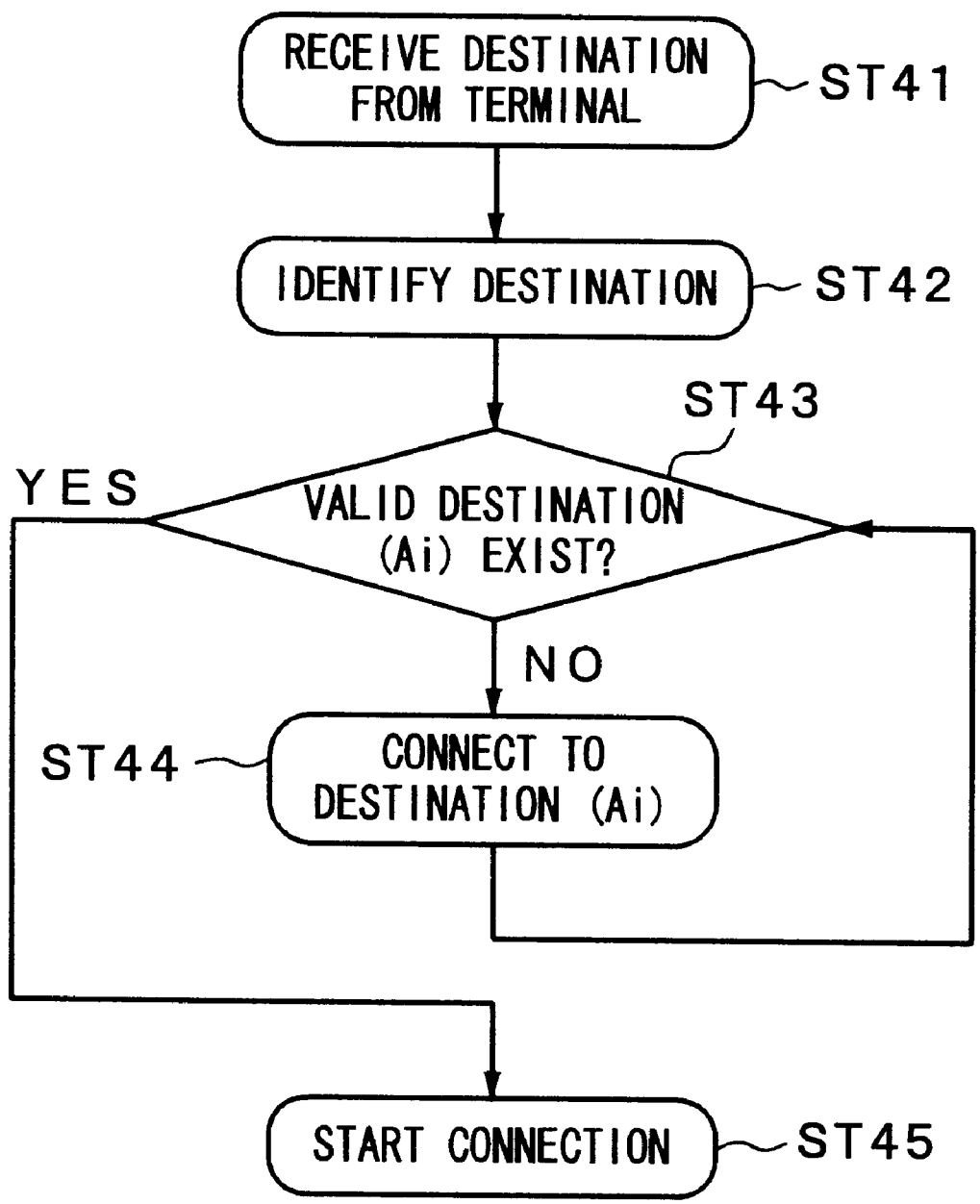
FIG. 15 is a schematic diagram f or u se in explanat ion of still another service of an internet telephone system to which the invention is applicable.

FIG. 15 is a flow chart of these transactions. In receipt of destination terminals and audio data from a source terminal (step ST41), the server identifies the destination terminals (step ST42). Then, the destination terminals are reviewed whether they are effective terminals (Ai), i.e., whether they are connected to the server (step ST43). If not, connection to the destination terminals is made (step ST44). When connection to the destination terminals is established, they become effective. In step ST43, if the destination terminals are effective, they are connected for communication with the source terminal (step ST45).

Figure 16:
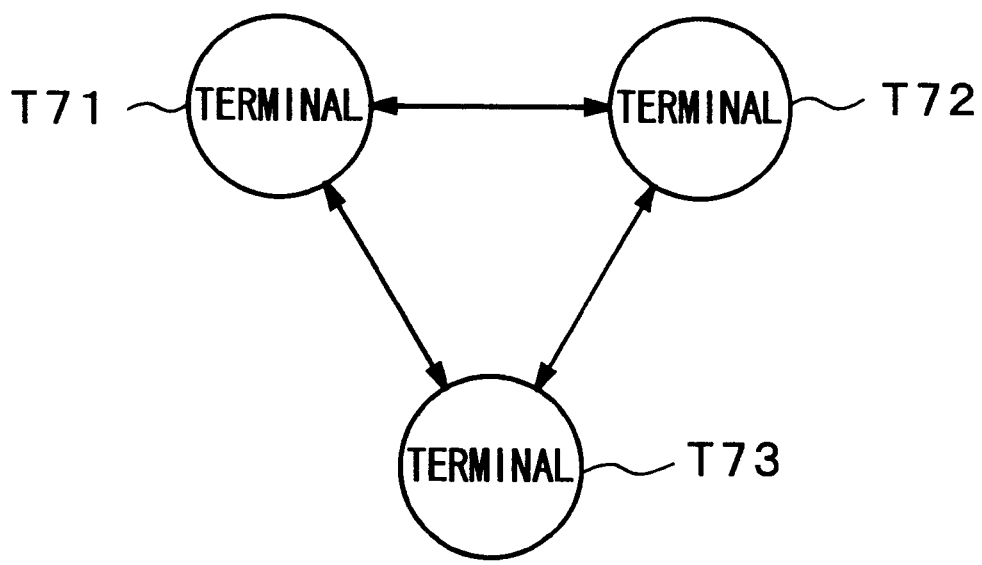
FIG. 16 is a schematic diagram for use in explanation of still another service of an internet telephone system to which the invention is applicable.

The use of a server to mediate such a call by a triplet can alleviate the traffic as compared with a call by a plurality of terminals not using a server. That is, if three or more terminals T71, T72, T73, et seq. are connected for common communication not through a server as shown in FIG. 16, audio data must be sent from the terminal T71 to the terminal T72, T73, et seq., from T72 to T71, T73, et seq., from T73 to T71, T72, et seq., and this increases the traffic as square of the number of terminals. Therefore, the load of the traffic becomes unacceptably heavy when the number of terminals participating on a common call increases.

When a server is used, audio data for all of the terminals T61, T62, T63, et seq. may be sent only to the server S61. Therefore, the traffic increases in proportion to the number of participants of the call, and this ensures a less load of the traffic than that of a call not through a server.

The internet telephone system to which the invention is applied as explained above may use exclusive internet telephone apparatus as its terminals.

Figure 17:
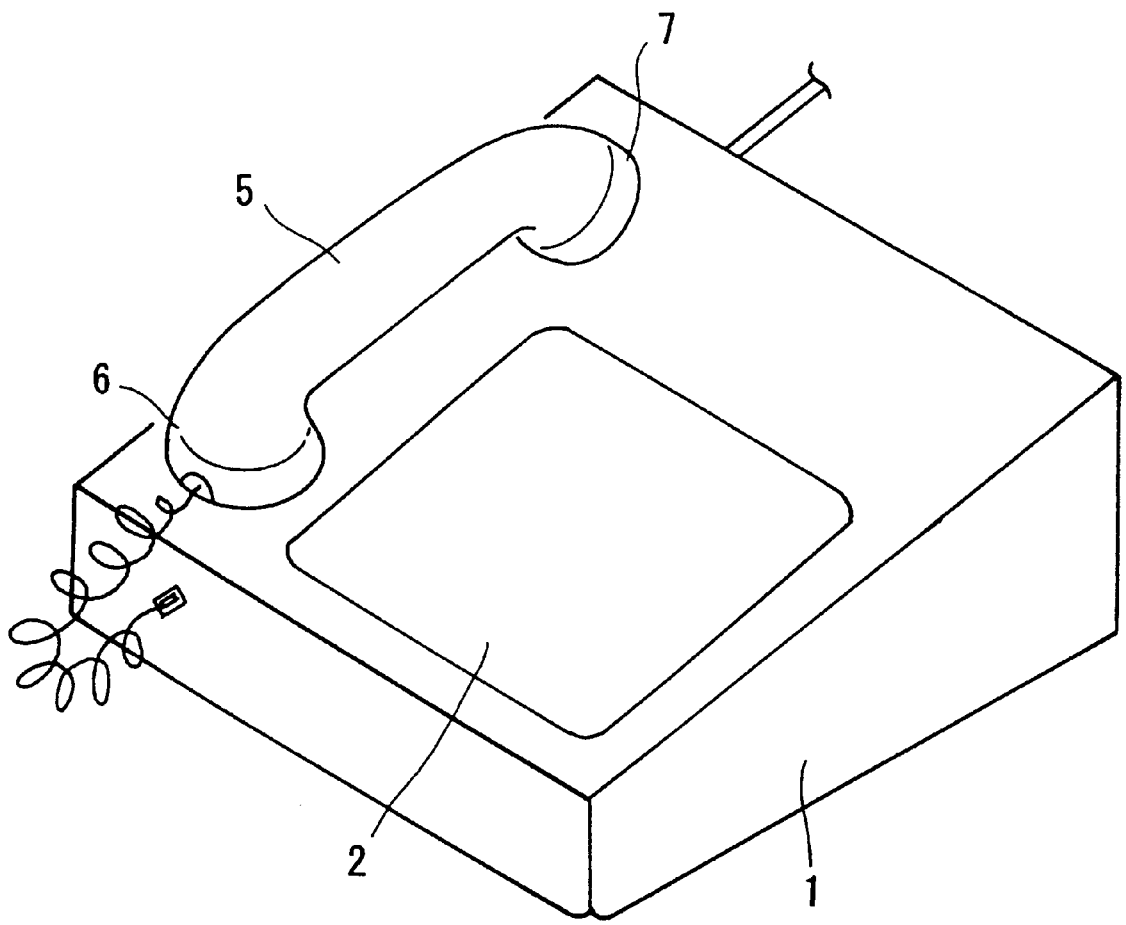
FIG. 17 is a perspective view of a telephone set used in an internet telephone system to which the invention is applied.
Figure 18:
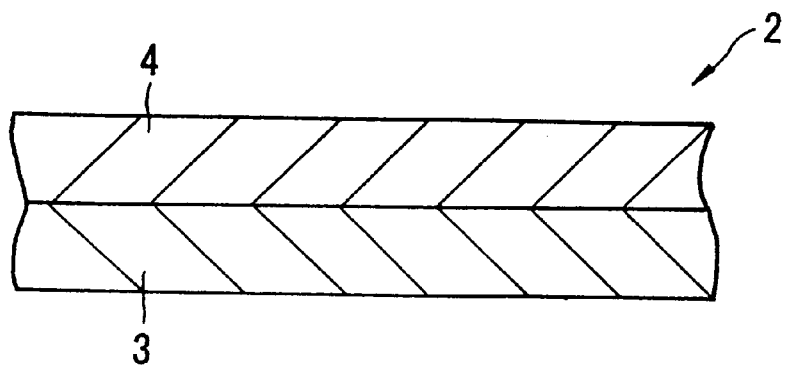
FIG. 18 is a cross-sectional view for use in explanation of a telephone set used in an internet telephone system to which the invention is applied.

FIG. 17 shows an internet telephone apparatus. In FIG. 17, numeral 1 denotes the main telephone body. The main telephone body 1 has a display/operator 2 on its upper surface. The display/operator 2 is a multi-layered panel including a touch panel 4 stacked on a display panel 3 as shown in FIG. 18. The display/operator 2 displays icons of numerical keys, operational keys, and so forth, which permit a user to enter a desired instruction by pressing the touch panel 4 at the portion of a corresponding icon. The display/ operator 2 also displays a help message explaining how to operate the keys and the current status of the telephone apparatus in addition to key icons, etc. Other various information is also displayed on the display/operator 2. A handset 5 is connected to the main telephone body 1. The main telephone body 1 is connected to a public telephone line.

Figure 19:
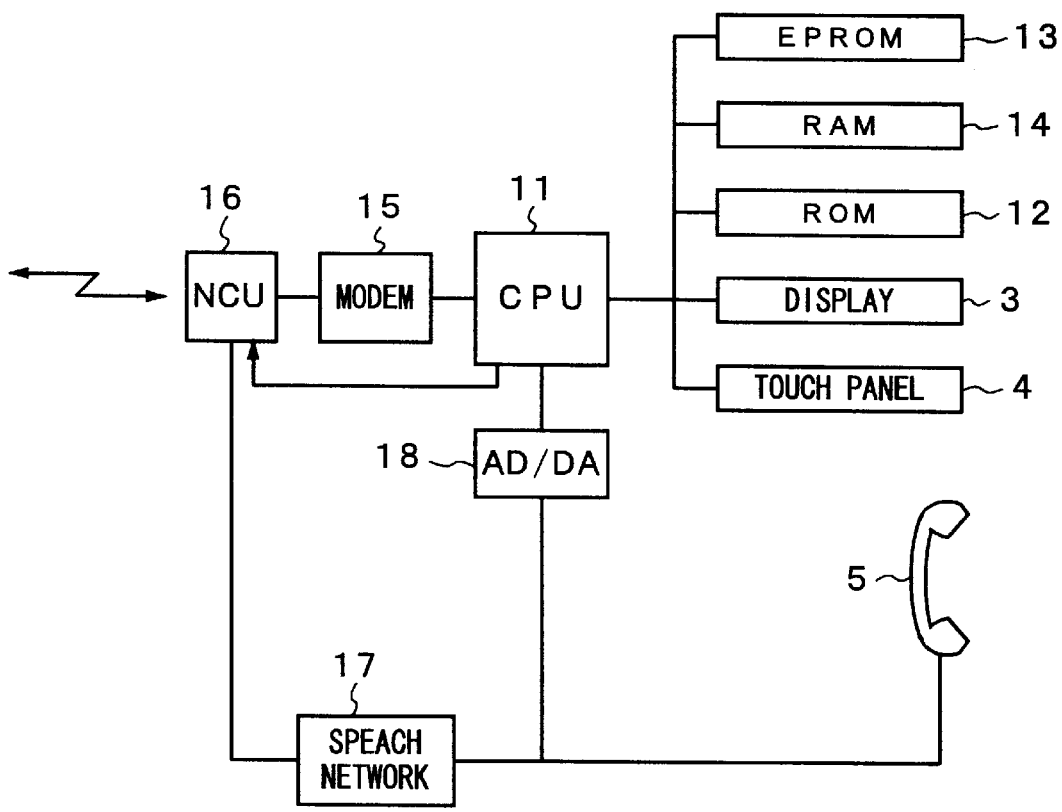
FIG. 19 is a block diagram of a telephone set to be used in an internet telephone system to which the invention is applied.

FIG. 19 shows the interior construction of the internet telephone apparatus. In FIG. 19, numeral 11 denotes a CPU. Connected to the CPU 11 are ROM 12, EPROM 13 and RAM 14. Inputs from the touch panel 4 are given to the CPU 11, and outputs from the CPU 11 are displayed on the display panel 3.

CPU 11 performs dial connection processing, data transfer processing by IP, and audio signal compression/expansion processing. That is, when CPU 11 receives a destination address and other materials entered through the touch panel 4, it controls NCU (Node Control Unit) 16 to dial the telephone number of the server of the internet service provider to perform the telephone connection processing. When the telephone connection is completed, it proceeds to PPP connection processing. In some cases, a call may arrive from the server of the internet service provider, and PPP connection is requested. Also in such cases, CPU 11 performs telephone connection processing and, after completion of telephone connection, connection processing by PPP. During communication, CPU 11 executes compression or expansion of transmitted or received audio signals, and executes transmission processing by IP.

The audio signal through the microphone of the handset 5 are converted into a digital form by an A/D and D/A converter 18. The digital audio signal is sent to CPU 11 for compression processing there. The compressed audio signal is supplied to NCU 16 through a modem 15.

The compressed audio signal sent through the telephone line is delivered to CPU 11 via NCU 16 and modem 15. CPU 11 expands the audio signal. The expanded digital audio signal is sent to the A/D and D/A converter 18 and converted into an analog form. The analog signal is supplied to the speaker of the handset 5.

The internet telephone apparatus can be used as an ordinary telephone apparatus. When it functions as an ordinary telephone apparatus, the handset 5 and NCU 16 are connected through a speech network 17 to enable communication by analog audio signals through the telephone line.

For using an internet telephone by PPP connection, a personal computer is prepared in most cases. Such a personal computer needs connection of a microphone and a speaker and needs installation of appropriate software for connection to the internet. It is difficult for users unfamiliar to computers to set a personal computer ready for connection to the internet. Moreover, a computer connected by PPP for use as an internet telephone is difficult to operate and is expensive.

The internet telephone apparatus described above does not need installation of software for connection to the internet, and can be easily connected to the internet for audio communication. Moreover, the internet telephone apparatus is equipped with the handset 5 like ordinary telephone apparatuses and can be operated in the same manner as ordinary telephone apparatuses. Therefore, even a user unfamiliar to computers can readily use the internet telephone. Especially, since the above-described internet telephone apparatus includes the display/operator 2 made by stacking the touch panel 4 on the display panel 3, its operability is good.

The internet telephone apparatus is mainly installed in fixed locations in homes and offices. As internet telephones spread, users desire to carry internet terminals when they leave their homes or offices. When a user carries an internet telephone, it will be convenient for him to use it to send audio data. However, the maximum value of digital data transmission rate of current portable telephones is 9600 bps that is insufficient for internet telephones.

A solution is to carry a pager and a terminal as portable devices while previously setting in a server a request for informing the pager of any call as described above, so that the user informed of the call can connect his terminal to a nearest wired public telephone line to use the internet telephone. If the pager has a message transmitting function, the user can review the telephone number or user name of the source terminal displayed on the pager by the server before deciding whether he should answer the call or not.

Depending on the location where a user currently is, it is sometimes impossible or takes time to connect its terminal to a telephone line. Taking it into account, if the server once disconnects the source terminal regardless of the current situation of the user of the destination terminal after informing his pager of a call, then re-connects to the destination terminal after establishing connection to the destination terminal, and brings both terminals into communication with each other, any inconvenience to the user of the source terminal can be avoided. In this case, if the server reserves an IP address for the source terminal and previously informs it to the source terminal, later connection can be made more smoothly.

For a user carrying his pager and a terminal, if information received by a pager can be sent to the terminal, he can complete connection by a simple operation without referring to the telephone number of the server and the address of the source terminal. With regard of designation of the telephone number of the server, the use of a bi-directional pager is advantageous because the current location of the pager is known, and a server nearest to the user and most economical can be designated.

Figure 20:
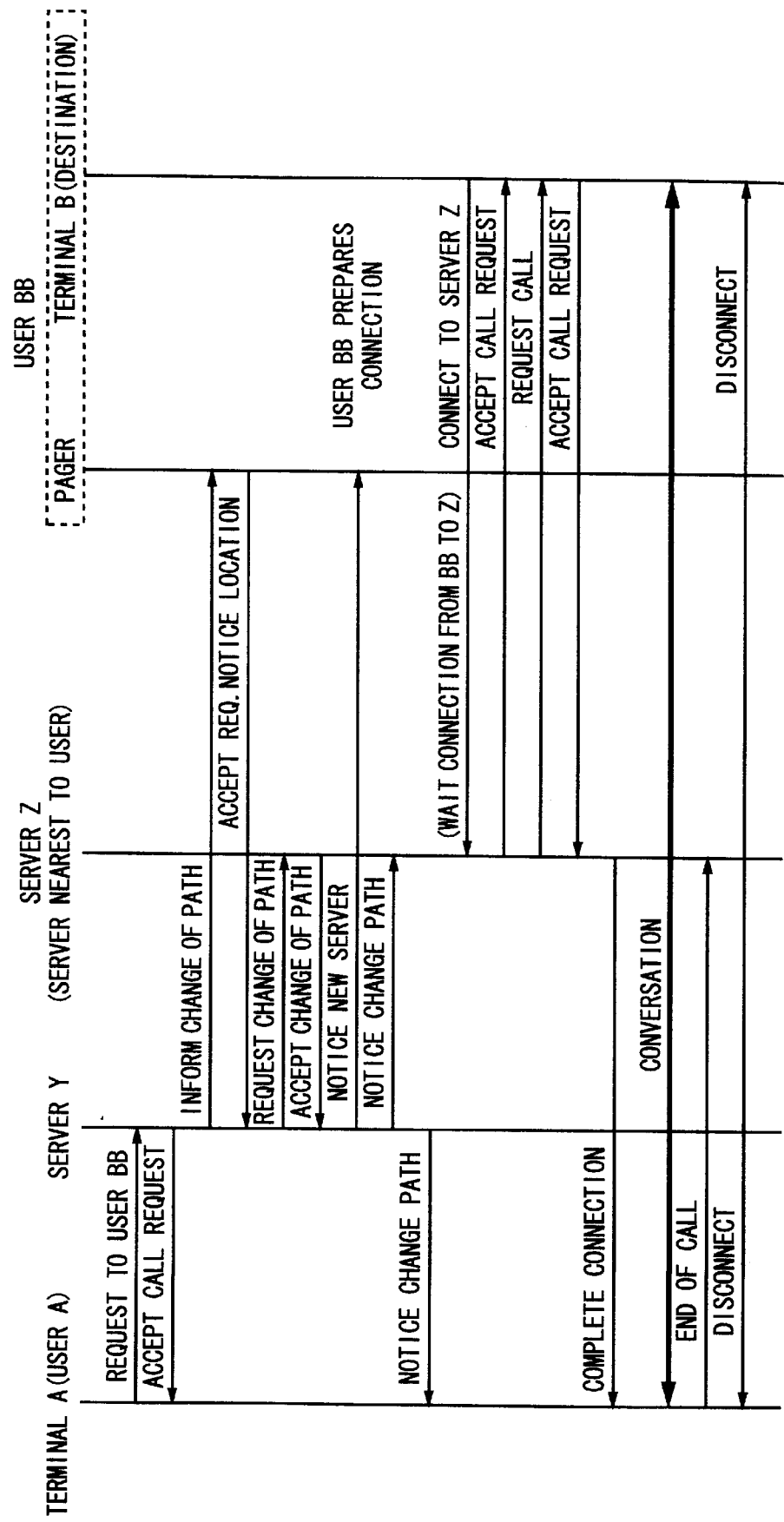
FIG. 20 is a flow chart for use in explanation of a pager to be used in an internet telephone system to which the invention is applied.

FIG. 20 shows a way of use of internet telephones when a user carries his terminal with him.

When the user AA of a source terminal A requests a call to the user BB, a server Y returns a call request acceptance to the source terminal user AA. The user BB previously requested the server to call up his pager upon a call to him, and the server Y now informs the pager of the call request.

In receipt of the call request from the server, the pager sends acknowledgement of the call request and reports his current location. The server Y searches out a most economical and convenient server, referring to the geographic information given from the pager.

Assuming that the server Z is the most economical, convenient server for the user BB, the server Y sends the server Z a path change request. If the server Z is available for such change, it sends back to the server Y a path change allowance. In receipt of the path change allowance, the server Y informs the pager of the server to be connected, and informs the server Z of path change information.

The user BB knows from the information sent from the server Y to the pager that he may connect to the server Z, and the user BB connects his portable terminal B to the server Z.

The server Z returns a connection allowance, and issues a call request. In receipt of the call request, the terminal B returns a call request acceptance. As a result, the terminal B is connected to the server Z.

When connection between the terminal B and the server Z is established, terminals A and B are connected on line, and conversation is made between the source terminal user AA and the destination terminal user BB.

When the call comes to an end and a call ending notice is sent from the terminal A to the server Z, the server Z disconnects the terminals A and B.

Figure 21:
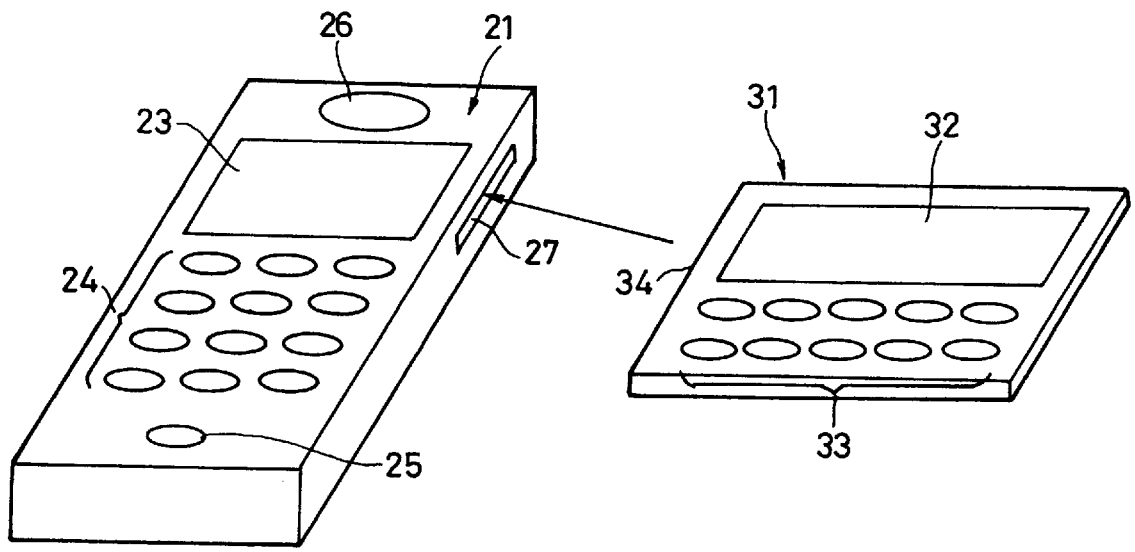
FIG. 21 is a perspective view for use in explanation of a pager to be used in an internet telephone system to which the invention is applied.

FIG. 21 shows a portable internet telephone terminal and a pager that are usable as a portable internet telephone apparatus. In FIG. 21, numeral 21 denotes a portable internet telephone terminal. The portable internet telephone terminal 21 has a display portion 23 and operation keys 24, and is equipped with a microphone 25 and a speaker 26. The portable internet telephone terminal 21 also has a card drive 27. Although the internet telephone terminal 21 basically has the same features as the above-described internet telephone apparatus, its size and weight is smaller to suit for its portable use.

Numeral 31 denotes a pager. The pager 31 is in the form of a card having a display portion 32 and operation keys 33. The pager 31 has a connection terminal 34 and can be set in the card drive 27 of the portable internet telephone terminal 21. When the pager 31 is set in the card drive 27, the pager 31 is connected to the portable internet telephone terminal 21 via the connection terminal 34, and can deliver received data from the pager 31 to the portable internet telephone terminal 21.

Figure 22:
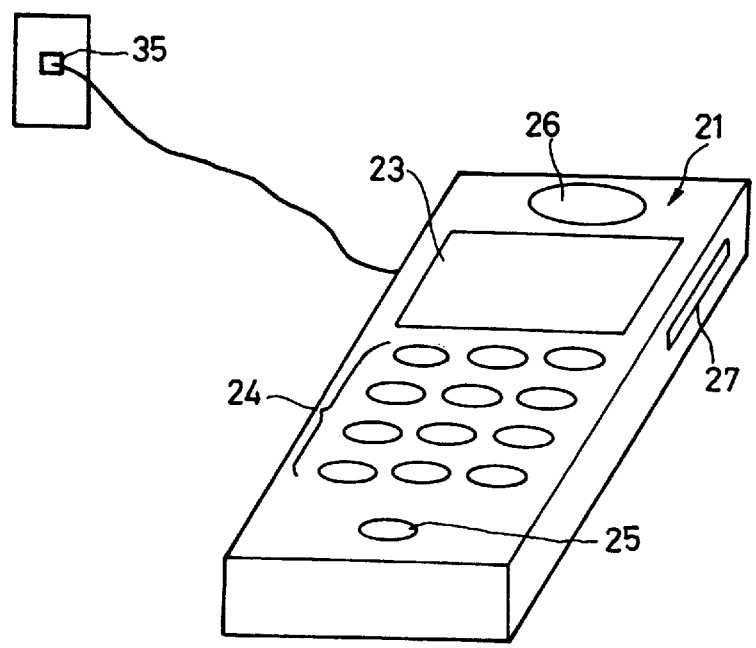
FIG. 22 is a perspective view for use in explanation of a pager to be used in an internet telephone system to which the invention is applied.

The pager 31 can be used as an ordinary pager when it is removed from the portable internet telephone terminal 21. If a user wants to use the portable internet telephone terminal 21 when he is out, he may carry both the portable internet telephone terminal 21 and the pager 31. They may be held separately, or the pager 31 may be set and held in the portable internet telephone terminal 21. If a user in advance requests the server to call up the pager 31 when any call to him arrives, a call to him is received by the pager 31. In receipt of the call, the user connects his portable internet telephone apparatus 21 to a public telephone line 35 as shown in FIG. 22, and may use the internet telephone through the public telephone line 35. If the pager 31 is held in the card drive 27 of the portable internet telephone terminal 21, received information is sent from the pager 31 to the portable internet telephone terminal 21. Therefore, the user can complete connection with a simple operation without entering the telephone number of the server and the address of the source terminal.

As described above, the invention can realize various services, such as connecting or disconnecting previously registered terminals alone, displaying information on a source terminal, and sending a notice of absence during absence of a destination terminal. Moreover, it can realize the service to give a user information on a call to him through his e-mail, facsimile or pager. This service of advising a call to a user enables the user to carry his pager and terminal with him and to use the internet telephone even when he is out. Also realized is the service to transfer a call to a user to his other terminal or portable telephone. The invention also permits three or more persons to participate a common telephone call without increasing the traffic density.

What is claimed is:

1. A server of a computer network telephone system having a computer network that connects a plurality of terminal devices via at least said server to transmit data containing audio data between the terminal devices, comprising:

means for providing predetermined services for one of said plurality of terminal devices connected through said computer network when said server has received predetermined information from said one of said plurality of terminal devices, wherein if said predetermined information is a notice of absence, when said server receives a call request for said one of said plurality of terminal devices as a destination terminal for said call request, said server performs one of said predetermined services including promptly sending at a time of receiving said call request a notice of said call request by facsimile to a designated facsimile number or by e-mail to a designated e-mail address, wherein if said predetermined information is a transfer request, when said server receives said call request for said one of said plurality of terminal devices as a destination terminal for said call request, said server performs another one of said predetermined services including promptly calling up a designated telephone number or a designated pager at a time of receiving said call request, and wherein said call request is transferred to each transfer destination in a priority order designated by a user until said call request is answered.

2. The server of a computer network telephone system according to claim 1, wherein, when said server receives a call request to for said one of said plurality of terminal devices as the destination terminal of said call request, and said server has previously received said notice of absence as said predetermined information, said server stores log information indicating said call request.

3. The server of a computer network telephone system according to claim 1, wherein, when said server receives said call request for said one of said plurality of terminal devices as the destination terminal of said call request, and said server has previously received said notice of absence as said predetermined information from said one of said plurality of terminal devices, said server sends a notice of said call request to said designated e-mail address by e-mail.

4. The server of a computer network telephone system according to claim 1, wherein, when said server receives said call request for said one of said plurality of terminal devices as the destination terminal of said call request, and said server has previously received said notice of absence as said predetermined information from said one of said plurality of terminal devices, said server sends a notice of said call request to said designated facsimile number by facsimile.

5. A server of a computer network telephone system having a computer network that connects a plurality of terminal devices via at least said server to transmit data containing audio data between the terminal devices, comprising:

means for providing predetermined services for one of said plurality of terminal devices connected through said computer network when said server has received predetermined information from said one of said plurality of terminal devices, wherein if said predetermined information is a transfer request, when said server receives a call request for said one of said plurality of terminal devices as a destination terminal for said call request, said server performs one of said predetermined services including promptly calling up at a time of receiving said call request a designated telephone number or a designated pager, and wherein said call request is transferred to each transfer destination in a priority order designated by a user until said call request is answered.

6. The server of a computer network telephone system according to claim 5, wherein, when said server receives a call request for said one of said plurality of terminal devices as the destination terminal of said call request, and said server has previously received said transfer request as said predetermined information, said server calls up said designated pager.

7. The server of a computer network telephone system according to claim 6, wherein said server informs said pager of an optimum server for connecting said pager with said call request.

8. The server of a computer network telephone system according to claim 1, wherein, when said server receives a call request for said one of said plurality of terminal devices as the destination terminal of said call request, and said server has previously received a call choice request as said predetermined information, said server reviews whether said call request is from a source terminal specified by said call choice request, and determines whether to connect said source terminal to said destination terminal based on the review.

9. A server of a computer network telephone system having a computer network that connects a plurality of terminal devices through at least one of said server and other servers to transmit data containing audio data between said plurality of terminal devices, said computer network having a router for connecting to other computer networks comprising said respective other servers, said server comprising:

means for connecting a source terminal which is connected to said computer network system through said server and a plurality of destination terminals through said computer network and other computer networks when said server receives a call request from said source terminal for said plurality of destination terminals, wherein said server temporarily disconnects at least one of said source terminal and said plurality of destination terminals if a disconnect request from one or more of said source terminals and said plurality of destination terminals is issued.

10. The server of a computer network telephone system according to claim 9, further comprising means for dividing said source terminal and plurality of destination terminals into two or more groups in response to a request from one or more of said source terminal and plurality of destination terminals.

* * * * *